United States Patent [19]

Kohan

[11] 4,351,916

[45] Sep. 28, 1982

[54] POLYOXYMETHYLENE MOLDING BLENDS

[75] Inventor: Melvin I. Kohan, Wilmington, Del.

[73] Assignee: E. I. Du Pont de Nemours and Company, Wilmington, Del.

[21] Appl. No.: 261,482

[22] Filed: May 7, 1981

Related U.S. Application Data

[63] Continuation-in-part of Ser. No. 185,409, Sep. 9, 1980, abandoned.

[51] Int. Cl.³ .................. C08L 59/07; C08L 77/00; C08L 59/04
[52] U.S. Cl. .................................. 524/377; 524/376; 525/154; 525/400; 525/405
[58] Field of Search .................... 525/154, 400, 405; 260/28 R, 28.5 AV; 524/376, 377

[56] References Cited

U.S. PATENT DOCUMENTS

| | | | |
|---|---|---|---|
| 2,993,025 | 7/1961 | Alsup et al. | 260/42 |
| 3,631,124 | 12/1971 | Burg et al. | 260/823 |
| 3,960,984 | 6/1976 | Kohan | 525/400 |
| 4,098,843 | 7/1978 | Johnson | 260/857 |

FOREIGN PATENT DOCUMENTS 37-8816 2/1962 Japan.

*Primary Examiner*—Paul Lieberman

[57] ABSTRACT

A polyoxymethylene molding composition comprising an admixture which contains a small amount of poly(ethylene glycol) and a small amount of a dispersion of polyamide in a carrier resin.

8 Claims, No Drawings

POLYOXYMETHYLENE MOLDING BLENDS

CROSS REFERENCE TO RELATED APPLICATION

This application is a continuation-in-part of application Ser. No. 185,409 filed Sep. 9, 1980, now abandoned.

BACKGROUND

It is known that poly(ethylene glycol) can be added to polyoxymethylene to lower melt viscosity (Jap. Pat. No. 8816/'62). This is done in order to avoid high processing temperatures that might induce decomposition. However, this technique has been of limited value because commercially available poly(ethylene glycol) contains impurities and when used with well-known polyoxymethylene stabilizers, such as those disclosed in Alsup and Lindvig, U.S. Pat. No. 2,993,025, stabilization is inhibited.

The well-known stabilizers for polyoxymethylenes to improve thermal stability are superpolyamides of melting point less than 220° C. The applicability of higher-softening polyamides for the purpose of thermally stabilizing polyoxymethylene is described in Johnson U.S. Pat. No. 4,098,843. The Johnson patent teaches that these higher-softening polyamides also reduce mold deposit. The higher-softening polyamides are predispersed in a suitable carrier resin in order to achieve small particle size when dispersed in the polyoxymethylene.

There is nothing in the art to suggest how to resolve the destabilizing effect of the addition of poly(ethylene glycol) to polyoxymethylene except via the use of increased amounts of polyamide stabilizers which have detrimental effects on mold and die deposit, surface appearance, and ultimately on physical properties. U.S. Pat. No. 4,098,843 shows no stabilizing advantage over U.S. Pat. No. 2,993,025 and, indeed, carries the implication of larger additive requirements for comparable stability because of the presence of the carrier resin.

It is desirable to obtain a polyoxymethylene molding blend which does not possess this destabilizing effect when poly(ethylene glycol) is present.

SUMMARY OF THE INVENTION

It has now been discovered that small amounts of the predispersed polyamide stabilizer are surprisingly effective in the presence of relatively large amounts of commercial grade poly(ethylene glycol) in achieving thermal stability. By use of this invention, the mold deposit advantage of the predispersed stabilizer is retained without the use of large additive amounts that lead to loss in surface quality and other properties. The surprising and unexpected nature of this invention is the high ratio of poly(ethylene glycol) to polyamide which can be achieved while retaining good stability in the blend. In other words, for a given amount of added poly(ethylene glycol), excellent stability is surprisingly achieved with significantly lower amounts of predispersed polyamide than with a polyamide not previously dispersed in a carrier resin.

Specifically the compositions of this invention are polyoxymethylene blends consisting essentially of:
(a) polyoxymethylene,
(b) 0.1–10 percent, preferably 0.5–5 percent, by weight of blend, poly(ethylene glycol), and
(c) 0.15–3 percent, preferably 0.4–2.0 percent, by weight of blend, of a dispersion of polyamide in a carrier resin, the polyamide comprising about from 10 to 50 wt % of the dispersion and being present in the carrier resin as particles no greater than about 5 microns; the carrier resin being inert to the oxymethylene polymer and having a melting point at or below the processing temperature of the oxymethylene polymer.

DESCRIPTION OF THE INVENTION

The oxymethylene polymers which can be used in the instant invention include a wide variety of homopolymers and copolymers known in the art. These polymers are generally addition polymers of formaldehyde in which the polymer chain, exclusive of the terminal portions of the chain, is a series of methylene to oxygen linkages of the general formula $-(CH_2-O)_n$ in which n is an integer of at least 500. The polymer chain can also comprise moieties of the general formula:

wherein m is an integer of 1 to 5 and $R_1$ and $R_2$ are inert substituents which will not cause undesirable reactions in the polymer. Such additional components of the polymer chain are present in a minor proportion of the repeating units, preferably less than 40 percent and especially in less than 5 percent of the oxymethylene repeating units.

The poly(ethylene glycol) employed herein is a well-known, commercially available material. It has a molecular weight of several hundred to tens of thousands. One common trade name is "Carbowax" poly(ethylene glycol). The destabilizing impurity which inhibits thermal stability is not known with certainty, but may be residues from catalysts employed in the polymerization of ethylene oxide. There is an economic advantage to using commercially available poly(ethylene glycol) in polyoxymethylene blends. Purified grades of poly(ethylene glycol) would obviate the need for the instant invention but at a cost penalty.

The polyamides can vary widely in composition and molecular weight. They are selected from the many macromolecular polyamides known in the art in which carboxamide linkages:

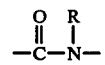

form an integral part of the polymer chain. These polyamides preferably have carboxamide linkages in which R is hydrogen, alkyl or alkoxy. The molecular weight of the polyamides can vary widely, with degrees of polymerization ranging about from 50 to 500.

The particular polymeric carrier resin into which the stabilizing polyamide is dispersed should be selected to melt at or below the processing temperature of the oxymethylene polymer and be inert to the oxymethylene polymer. The processing temperature is typically in the range of about from 170° C. to 240° C., and preferably about from 190° to 220° C. In addition, for satisfactory preparation of the polyamide dispersion, the carrier resin should have a decomposition temperature higher than the melting temperature of the polyamide. Within these guidelines, a wide variety of specific carrier resins can be used, as will be evident to those skilled in the art. These include, for example, polyethylene and copolymers of ethylene with methyl acrylate, ethyl acrylate, vinyl acetate, acrylonitrile, carbon monoxide, or methyl methacrylate, and especially ethylene/methyl acrylate copolymers containing about from 15 to 30 weight percent methyl acrylate and having a melt index of about from 0.5 to 100, and preferably about from 2 to 20. Still other materials which can be used as the carrier resin include methacrylate and acrylate polymers, such as polymethyl methacrylate containing about from 4 to 15 percent ethyl acrylate, copolyesters, polyetheresters, polystyrene, styrene/acrylonitrile copolymers, polyethylene oxide and mixtures of two or more of such polymers.

In the preparation of the instant compositions, the polyamide and the carrier resin are first blended at a temperature above the melting temperatures of both the polyamide and the carrier resin. These components are generally blended in a high shear mixing device of the type known in the art, to disperse the polyamide in the carrier resin as fine particles. The polyamide should be subdivided to a particle size less than about 5 microns, and preferably less than about 2 microns. The polyamide/carrier resin blend should contain about from 10 to 50 weight percent polyamide, and preferably about from 25 to 40 weight percent.

Any convenient apparatus can be used for the admixture of the carrier resin and the polyamide stabilizer, so long as the required small particle size of the dispersed polyamide is obtained. In one preferred blending procedure, polyamide and carrier resin granules are first dry blended and then melt extruded in a high shear twin screw extruder, followed by cutting the extruded strands.

The polyamide/carrier resin blend is then admixed with oxymethylene polymer and the poly(ethylene glycol) at a temperature above the melting temperature of both the oxymethylene polymer and the carrier resin while below the melting temperature of the polyamide, to obtain a substantially uniform dispersion of the polyamide throughout the oxymethylene blend. The quantity of the polyamide/carrier resin blend used will vary depending upon the particular oxymethylene polymer used, the amount of poly(ethylene glycol) used, and the degree of stability desired. However, in general, the polyamide/carrier resin comprises about from 0.15-3 percent, and preferably about from 0.4-2.0 percent by weight of the final product.

Various additives, such as pigments, fillers, antioxidants, and the like, can also be included in the compositions of the instant invention at various stages in the preparation. For example, a compatibilizing agent can be incorporated into the blend of polyamide and carrier resin, generally comprising about from 0.5 to 30 weight percent of the polyamide/;carrier resin dispersion. When an ethylene polymer or copolymer is used as the carrier resin, a variety of compatibilizing agents can be used to advantage, including an ethylene copolymer of acrylic or methacrylic acid; such ethylene copolymers partially neutralized with alkali or alkaline earth metals such as zinc; graft copolymers of such partially neutralized compounds with low molecular weight polyamide; as well as ethylene-propylene polymers thermally grafted with compounds such as fumaric acid, maleic anhydride, and ethyl hydrogen maleate. When the carrier resin is a methacrylate or acrylate polymer, particularly suitable compatibilizing agents include methacrylate or acrylate copolymers containing acidic or basic functional groups.

The compositions of the instant invention can be used in the fabrication of a wide variety of shaped articles by molding.

The invention is further illustrated by the following specific examples, in which parts and percentages are by weight unless otherwise indicated.

EXAMPLES

Preparation

The composition of Table 1 were prepared by dry blending the ingredients and feeding the mix to a laboratory extruder of the kind indicated. The molten extrudate was in the form of a ribbon which was quenched, cut, and dried prior to determination of the stability index. The stabilizer dispersion identified as PP (predispersed polyamide) in Table 1 was prepared by mixing the ingredients prior to extrusion through a corotating, self-wiping, twin-screw extruder. The cut, predispersed stabilizer product was then used in the polyoxymethylene formulation. This procedure is in accordance with the description found in Johnson U.S. Pat. No. 4,098,843 and the polyamide particle size can be measured as described therein.

The thermal stability of the blends was determined by measuring the volume of gas evolved at 259° C. A 0.5 gram sample was heated at 259° C. for 30 minutes in a calibrated syringe under a nitrogen atmosphere. The volume of gas evolved during the 5-minute to 30-minute interval was used as a measure of thermal stability.

Table 1 below records thermal stability results of compositions of this invention (Examples 1-4 in the Table) and compares these results with results obtained with comparison compositions (Controls A-I in the table). The results are discussed below.

Compositions A-D of Table 1 show that polyoxymethylene with or without antioxidant and/or a commercial grade of poly(ethylene glycol) has a stability index (SI) in the range of 24-36. Composition E involves the addition of a stabilizer (66/610/6 polyamide) of the type described in U.S. Pat. No. 2,993,025 to polyoxymethylene free of poly(ethylene glycol). The SI is lowered to about 9. Composition F involves the addition of a predispersed polyamide (PP) of the type described in U.S. Pat. No. 4,098,843 to polyoxymethylene free of poly(ethylene glycol). The SI is lowered to about 7. Compositions E and F illustrate, therefore, the efficacy of polyamide stabilizers when no poly(ethylene glycol) is present. Composition G shows that when a commercial grade of poly(ethylene glycol) is added to polyoxymethylene containing the 66/610/6 nylon stabilizer of the type described in U.S. Pat. No. 2,993,025, a severe loss in thermal stability occurs as is attested by the increase in the SI from about 9 to 20. On the other hand, when a predispersed polyamide (PP) is added in concentration significantly below that of the polyamide described in U.S. Pat. No. 2,993,025 and in the presence of poly(ethylene glycol), the polyoxymethylene composition has a much lower SI of 11.5 as demonstrated by composition 1, an Example of this invention. Composition 1 indicates the presence of 0.45 weight percent of PP. The polyamide comprises only one-third of the PP so that the concentration of polyamide is in fact only 0.15 weight percent. Thus, the polyamide level of Composition 1 is only one-fifth that of Composition G but still results in a product of superior thermal stability.

It is believed that the polyamide acts as an acid and formaldehyde scavenger because of interaction of these degrading entities with the amide function of the polyamide. The very much lower level of amide function in the PP stabilizer would not commend it over the 66/610/6 in situations where stability is suspect as in the case of poly(ethylene glycol) modification. To the contrary, the PP stabilizer would be expected to be less effective at even the same stabilizer and poly(ethylene glycol) concentrations because it is only one-third polyamide.

Composition H involves the addition of EMA to polyoxymethylene containing the 66/610/6 stabilizer and poly(ethylene glycol). The absence of a significant change in SI establishes that it is not the carrier resin which is responsible for the surprisingly effective stabilization of PP. Composition 2, an Example of this invention, combines the two types of stabilizers and shows that the PP is effective in the presence of the 66/610/6 stabilizer.

Compositions 3 and 4, and I, involve a polyoxymethylene of lower molecular weight than used in compositions heretofore. Composition I contains the combination of 0.75% 66/610/6 stabilizer and 1.1% poly(ethylene glycol) and has a high SI of about 18. Composition 3 is similar to I but replaces the 66/610/6 stabilizer with 0.45% PP which again involves only one-fifth as much polyamide. Once again a surprising improvement in thermal stability is realized with an SI of 11. In Composition 4 the poly(ethylene glycol) concentration is increased to 3.0% and the PP is at the 1.3% level which corresponds to 0.43% polyamide. In spite of almost trebling the amount of poly(ethylene glycol) and halving the amount of polyamide over Control I, the PP system of Composition 4 still yields a much lower SI than that of Composition I, approximately 11 vs. 18.

| Comparison (letter) Example (number) | Polyoxymethylene homopolymer mol WT | Polyamide Stabilizer Type | WT % | Poly(ethylene glycol) Type | WT % | Antioxidant WT % | Other WT % | Compounding Extruder | Stability Index[b] |
|---|---|---|---|---|---|---|---|---|---|
| A | 40,000 | None | | None | | None | None | 28mm twin screw | 29.8 |
| B | " | None | | None | | 0.10T[a] | None | " | 35.8 |
| C | " | None | | Carbowax 6000 | 1.1 | None | None | " | 24.4 |
| D | " | None | | Carbowax 6000 | " | 0.10T[a] | None | " | 25.9 |
| E | " | 66/610/6 | 0.75 | None | | None | None | " | 8.5 |
| F | " | PP[d] | 0.45 | None | | None | None | " | 6.7 |
| G | " | 66/610/6 | 0.75 | Carbowax 6000 | " | 0.10T[a] | None | " | 20.1 |
| H | " | " | " | Carbowax 6000 | " | " | EMA-0.3[c] | " | 21.8 |
| I | 33,000 | " | " | Carbowax 6000 | " | " | None | " | 17.7 |
| 1 | 40,000 | PP[d] | 0.45 | Carbowax 6000 | " | " | None | " | 11.5 |
| 2 | " | " | " | Carbowax 6000 | " | " | 66/610/6-.75 | " | 10.1 |
| 3 | 33,000 | " | " | Carbowax 6000 | " | " | None | " | 11.0 |
| 4 | " | " | " | Carbowax 6000 | 3 | " | None | 2 inch single screw | 10.8 |

[a]T = Tetrakis[methylene 3-(3',5'-di-t-butyl-4'-hydroxyphenyl)propionate]methane
[b]Volume of gas evolved between 5 and 30 minutes of heating at 259° C. of 0.50 grams of compounded formulation
[c]Ethylene/methylacrylate copolymer (79/21)
[d]Polyamide Predispersed = 33% polyamide-66, 66% EMA, 1% ethylene/methacrylic acid copolymer partially neutralized with zinc. Thus, the compositions shown contain only 0.15% polyamide for 0.45% PP and 0.43% polyamide for 1.3% PP.

I claim:
1. A polyoxymethylene blend consisting essentially of
   (a) polyoxymethylene,
   (b) 0.1–10 percent, preferably 0.5–5 percent, by weight of blend, poly(ethylene glycol), and
   (c) 0.15–3 percent, preferably 0.4–2.0 percent, by weight of blend, of a dispersion of polyamide in a carrier resin, the polyamide comprising about from 10 to 50 wt % of the dispersion and being present in the carrier resin as particles no greater than about 5 microns; the carrier resin being inert to the oxymethylene polymer and having a melting point at or below the processing temperature of the oxymethylene polymer.

2. The blend of claim 1 wherein the polyoxymethylene is a homopolymer.

3. The blend of claim 1 or 2 wherein the poly(ethylene glycol) is present in an amount of 0.5–5 percent by weight of blend.

4. The blend of claim 1 or 2 wherein the dispersions of polyamide in a carrier resin is present in an amount of 0.4–2.0 percent by weight of blend.

5. The blend of claim 3 wherein the diepersion of polyamide in a carrier resin is present in an amount of 0.4–2.0 percent by weight of blend.

6. The blend of claim 4 wherein the poly(ethylene glycol) is present in an amount of 0.5–5 percent by weight of blend.

7. The blend of claim 5 wherein the carrier resin is an ethylene copolymer.

8. The blend of claim 1 wherein in component (c), the polyamide is polyamide-66 and the carrier resin is a copolymer of ethylene and methyl acrylate.

* * * * *